(12) United States Patent
Tamai et al.

(10) Patent No.: US 7,637,842 B2
(45) Date of Patent: Dec. 29, 2009

(54) METHOD AND APPARATUS FOR CONTROL OF A TRANSMISSION TORQUE CONVERTER CLUTCH

(75) Inventors: Goro Tamai, West Bloomfield, MI (US); Daniel P. Laurent, Saline, MI (US); Birendra P. Bhattarai, Novi, MI (US); James L. Worthing, Munith, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 375 days.

(21) Appl. No.: 11/625,921

(22) Filed: Jan. 23, 2007

(65) Prior Publication Data

US 2008/0176705 A1    Jul. 24, 2008

(51) Int. Cl.
*B60W 10/02* (2006.01)
*B60W 10/04* (2006.01)
*H02P 15/00* (2006.01)
*G06F 7/00* (2006.01)
*G06F 17/00* (2006.01)
*F16H 61/00* (2006.01)

(52) U.S. Cl. .............. 477/6; 477/5; 477/8; 477/174; 477/168; 477/180; 701/67; 903/946

(58) Field of Classification Search .............. 477/6, 477/8, 13, 168, 174, 179, 180; 701/67, 68, 701/22; 903/940, 946
See application file for complete search history.

(56) References Cited

U.S. PATENT DOCUMENTS

| | | | |
|---|---|---|---|
| 5,484,353 A | 1/1996 | Lux et al. | |
| 5,882,279 A | 3/1999 | Ueki | |
| 6,183,389 B1 * | 2/2001 | Tabata | 477/5 |
| 6,220,987 B1 * | 4/2001 | Robichaux et al. | 477/97 |
| 6,817,328 B2 * | 11/2004 | Buglione et al. | 123/179.25 |
| 7,059,435 B2 * | 6/2006 | Niki et al. | 180/65.25 |
| 2005/0261111 A1 | 11/2005 | Kurogo et al. | |
| 2006/0108163 A1 * | 5/2006 | Kitano et al. | 180/65.2 |

* cited by examiner

*Primary Examiner*—Tisha D Lewis (57) ABSTRACT

A method and system to capture energy during regenerative braking while managing driveline disturbances by controlling locking and unlocking of a torque-converter clutch based upon operator input, typically throttle position or accelerator pedal position, vehicle speed, and engine load is offered. The exemplary vehicle has an engine, a torque converter with a clutch, and a transmission device. Vehicle kinetic energy is transmittable to an electrical machine using the transmission device and the torque converter. It includes monitoring an operator demand for power, engine operating speed, and, engine load; and, actuating the locking clutch for the torque converter based upon the operator demand for power, the engine operating speed, and, the engine load.

17 Claims, 4 Drawing Sheets

METHOD AND APPARATUS FOR CONTROL OF A TRANSMISSION TORQUE CONVERTER CLUTCH

TECHNICAL FIELD

This invention pertains generally to a transmission device for a hybrid vehicle, and more specifically to controlling a torque-converter clutch of an automatic transmission.

BACKGROUND OF THE INVENTION

A vehicle equipped with an internal combustion engine and automatic transmission which provides motive torque to a driveline typically employs a torque converter device having a lock-up device referred to as a torque-converter clutch ('TCC'). The typical torque-converter clutch comprises a fluid-operated friction device which, when fully actuated, mechanically couples an input impeller and output turbine of a torque converter, to permit transmission of torque therebetween. The input impeller is typically mechanically attached to a crankshaft of the engine, and the output turbine is typically mechanically attached to an input shaft of the transmission.

When the torque-converter clutch is fully actuated, engine torque perturbations can be passed directly to the vehicle driveline and hence to the vehicle. Vehicle calibrators typically generate torque-converter clutch apply/release calibrations, referred to as maps, that minimize driveline disturbances, referred to as NVH for 'noise, vibration, and harshness'. TCC apply-release maps are typically calibrated using operator input of either accelerator pedal position or throttle position ('TPS'), and, vehicle speed. When TPS and vehicle speed are used as calibration inputs, opportunities to apply the torque-converter clutch are typically not maximized, because some TPS values result in both acceptable and unacceptable levels of NVH, depending on engine speed and load. When the TPS and vehicle speed are used as calibration inputs, a single unacceptable NVH condition at a given TPS and vehicle speed effectively prevents applying the torque-converter clutch at all load conditions at the specific TPS/vehicle speed point.

Some vehicle systems implement hybrid powertrain systems which provide motive torque from the internal combustion engine, and are able to utilize stored electrical energy to assist vehicle operation to obtain benefits related to reduced fuel consumption and reduced exhaust emissions. One such system is an Engine Stop-Start (ESS) system, which uses many conventional powertrain components and subsystems, and implements engine fuel cutoff and engine stop events during occurrences of decelerations and vehicle stops. The engine is subsequently restarted when the vehicle operator so commands. One exemplary ESS system relies upon a high-voltage battery system, a power inverter and a motor-generator to provide ESS functionality.

Hybrid vehicle systems, including the ESS system, must ongoingly re-energize the vehicle electrical energy storage devices, which typically include high voltage battery systems or other electrical energy storage devices. Re-energizing the electrical energy storage devices can take the form of regeneration events, wherein electrical energy is derived from vehicle kinetic energy, and charging events wherein electrical energy is derived from vehicle engine power. Energy for charging typically comes from torque caused by engine rotation which drives an electric machine, i.e. a generator, which is operable to generate electrical energy for storage in the electrical energy storage device. Energy for regeneration typically comes from regenerative braking, wherein vehicle kinetic energy is captured by causing the driveline to transmit torque through the powertrain to the electric machine.

Figure 2:
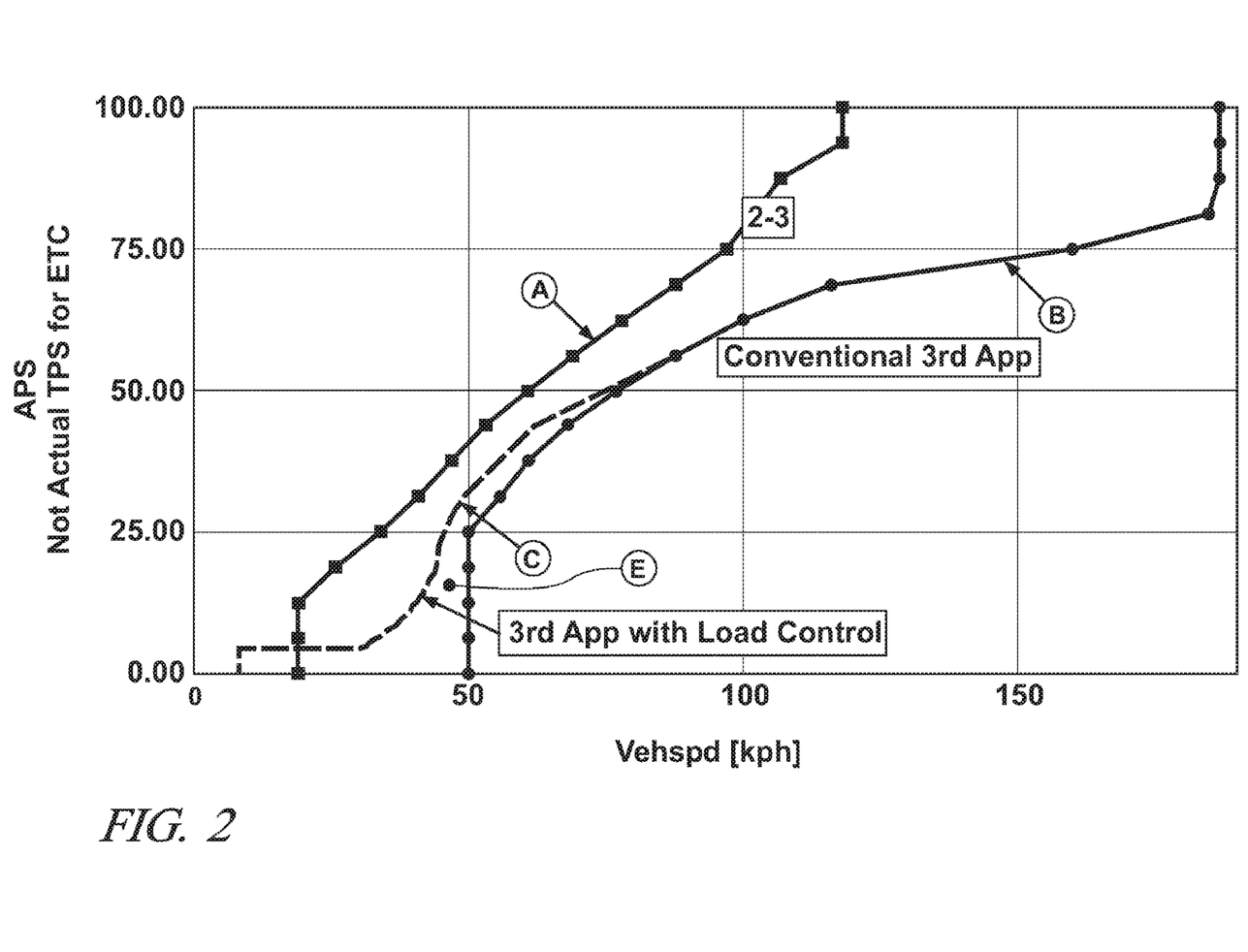
FIG. 2 is an exemplary datagraph, in accordance with the present invention; and, FIGS. 3 and 4 are exemplary datagraphs, in accordance with the present invention.

Electrical energy captured during regenerative braking is confined to that torque which can be transmitted through the entire powertrain to the electrical machine, which means an operating range in which the torque-converter clutch is in a lock mode or a controlled-slip mode. Referring now to FIG. 2, Line A shows a typical shift point from second to third gear of a four-speed automatic transmission, based upon vehicle speed and throttle position. Line B represents a typical operating line for torque-converter clutch actuation based upon vehicle speed and throttle position for third gear. In the operating region to the right of line B, the torque-converter clutch is applied. In the operating region to the left of line B, the torque-converter clutch is open, or unlocked, and regenerative braking is disabled. As can be seen, there is a substantial operating region between Lines A and B in which the vehicle may operate, but in which regenerative braking may not occur due to limitations related to NVH and other concerns.

There is a need to increase operating region of a torque-converter clutch on a vehicle employing regenerative braking in order to obtain the benefits thereof, without compromising vehicle NVH and other driveability concerns.

SUMMARY OF THE INVENTION

A method and system are offered which address the above-stated concerns and permits the vehicle to take more complete advantage of benefits achievable with broader operating region for torque-converter clutch application. The invention comprises a method and system to determine torque-converter clutch locking and unlocking based upon operator input, typically throttle position or accelerator pedal position, vehicle speed, and engine load, thus permitting more complete capture of energy during regenerative braking while managing driveline disturbances.

In order to achieve the object of this invention, a method and an article of manufacture are provided which are operable to electrically regenerate an electrical energy storage device using kinetic energy of a vehicle. The exemplary vehicle has an internal combustion engine operably coupled to an electrical machine and to a torque converter operably coupled to a transmission device. The vehicle kinetic energy is transmittable to the electrical machine electrically connected to the electrical energy storage device. The method comprises monitoring an operator demand for power, operating speed of the vehicle, and, an engine load. A locking clutch for the torque converter is actuated based upon the operator demand for power, the vehicle operating speed, and, the engine load.

An aspect of the invention includes actuating the locking clutch for the torque converter when the engine load is less than a first calibrated engine load, wherein the first calibrated engine load is determined based upon the operator demand for power and the vehicle operating speed.

Another aspect of the invention includes deactivating the actuated locking clutch for the torque converter when the engine load is greater than a second calibrated engine load, the second calibrated engine load determined based upon the operator demand for power and the vehicle operating speed.

Another aspect of the invention includes the first calibrated engine load greater than the second calibrated engine load at each monitored operator demand for power and each monitored vehicle operating speed.

Another aspect of the invention includes deactivating the actuated locking clutch for the torque converter at a vehicle speed less than a calibrated transmission shift vehicle speed when the operator demand for power is below a predetermined power threshold and the engine load is below the second calibrated engine load.

Another aspect of the invention includes actuating the locking clutch for the torque converter such that clutch slip is substantially nil, and, actuating the locking clutch for the torque converter such that there is a controlled clutch slip less than a predetermined amount of slip.

Another aspect of the invention includes actuating the locking clutch for the torque converter based upon the operator demand for power, the engine operating speed, the engine load, and, barometric pressure, and, operation of a cruise control system.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
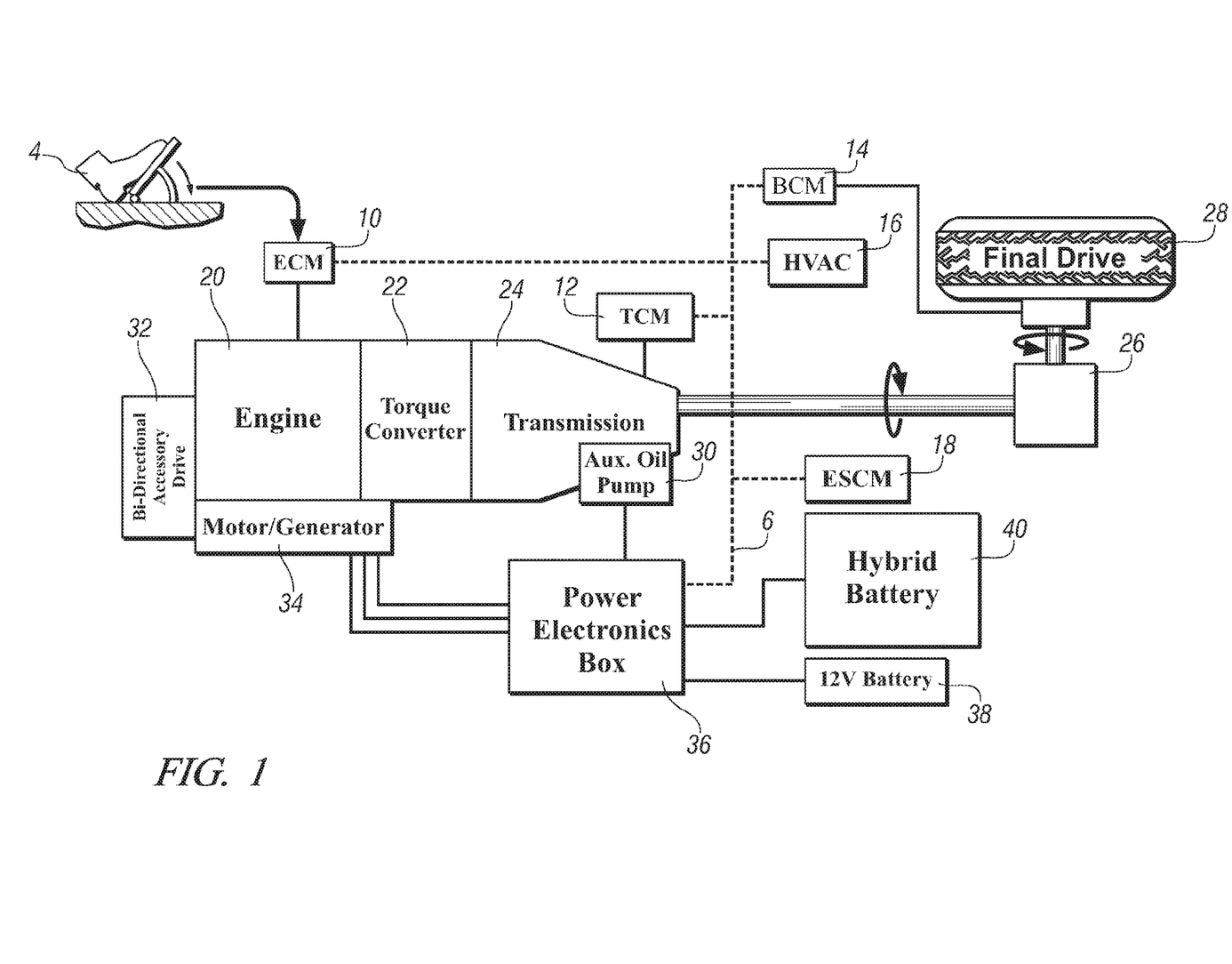
FIG. 1 is a schematic diagram of an engine and control system, in accordance with the present invention.

Referring now to the drawings, wherein the showings are for the purpose of illustrating the invention only and not for the purpose of limiting the same, FIG. 1 shows a schematic drawing of a vehicle propulsion system including an exemplary internal combustion engine and control system which has been constructed in accordance with an embodiment of the present invention. The exemplary system, described as a belt-driven alternator/starter ('BAS') system, comprises a powertrain system having internal combustion engine 20, a transmission 24 with torque converter 22, a motor-generator unit 34, and a Power Electronics Box ('PEB') 36, each signally and/or operably connected to a distributed control system via a local area network (LAN) bus 6. The distributed control system comprises an engine control module (ECM) 10, a transmission control module (TCM) 12, a brake control module (BCM) 14, an energy storage control module (ESCM) 18, and a heating-ventilation-air conditioning controller (HVAC) 16, among others.

The powertrain system includes the internal combustion engine 20 operable to provide tractive power to drive wheels 28 using known power transmission devices including the torque converter 22, including a torque converter clutch or TCC (not shown), the transmission 24, and a vehicle driveline 26, typically comprising a transaxle for a front wheel drive vehicle, or, alternatively, a rear differential unit for a rear wheel drive vehicle, or other known devices for delivering power to vehicle wheels. Alternatively, the vehicle is operable to transmit vehicle kinetic energy input as torque through the vehicle driven wheels 28, through vehicle driveline 26 to the transmission 24, torque-converter 22, and engine 20 to a bi-directional accessory belt drive system 32 and motor-generator unit 34.

The motor-generator unit ('MGU') 34 comprises an electrical machine operable to act as a torque-generative device and as an electrical-generative device, preferably depending upon vehicle operation and a control signal from the controller 10 to the Power Electronics Box ('PEB') 36, and other control signals. The PEB 36 includes the functions of a Power Inverter Module (PIM) and Auxiliary Power Module (APM), and is electrically coupled to the MGU 34 and a high-voltage ('HV') battery 40, preferably operating at 36/42 VDC, and a conventional twelve-volt battery 38, to selectively transmit electrical energy therebetween. The PEB is operable to control operation of an electrically-powered auxiliary oil pump 30 fluidly attached to a hydraulic circuit of the transmission 24 to provide pressurized fluid in the hydraulic circuit during specific operating conditions, including engine shutdown and vehicle shutdown. It is understood that the high voltage battery 40 and the conventional twelve-volt battery 38 may comprise any one of various devices operable to provide electrical energy storage capacity on the vehicle.

The internal combustion engine 20 is operably attached to the bi-directional accessory belt drive system 32, preferably at an engine crankshaft (not shown). The bi-directional accessory belt drive system 32 operates in a first operating condition, comprising an electrical energy generating mode and in a second operating condition, comprising a torque-generating mode. In the first, electrical energy generating mode, the internal combustion engine 20 provides torque to the accessory belt drive system 32, transferring power and energy to motor-generator unit 34 ('MGU') and other accessories. In the first mode the MGU 34 functions as the electrical energy generative device to replenish or charge the electrical energy storage system comprising the high-voltage ('HV') battery 40 and the twelve-volt battery 38, using torque generated by the engine 20 and/or kinetic energy from the vehicle. In the second, torque-generating mode, the MGU 34 functions as an electrical motor to generate torque which is transmitted to the internal combustion engine 20 via the accessory belt drive system 32 to start engine operation, using electrical energy stored in the electrical energy storage system. The MGU 34 may further function as the electrical motor to generate torque that is transmitted to the engine 20 to stabilize engine operation and provide torque damping to the vehicle driveline.

The distributed control system comprising an integrated vehicle control system wherein the controllers, including ECM 10, TCM 12, BCM 14, HVAC 16 are signally connected via LAN 6 to accomplish various tasks. Each of the aforementioned control processors is preferably a general-purpose digital computer generally including a microprocessor or central processing unit, ROM, RAM, and I/O including A/D and D/A. Each control processor includes a set of control algorithms, comprising resident program instructions and calibrations stored in ROM and executed to provide the respective functions. Information transfer between the various control processors is preferably accomplished by way of the aforementioned LAN.

The distributed vehicle control system is signally attached to a plurality of sensing devices and operably connected to a plurality of output devices to ongoingly monitor and control operation of the engine 20, the transmission 24, and the MGU 34 and the PEB 36. This includes monitoring conditions of the HV battery 40, and, determining state of charge of the HV battery 40. The controlled output devices preferably include subsystems for proper control and operation of the engine 20, including, by way of example, an air intake system including a throttle control system, a fuel injection system, a spark-ignition system (when a spark-ignition engine is used), an exhaust gas recirculation system, and an evaporative control system. The sensing devices (not shown) include devices operable to monitor engine operation, including engine crankshaft speed (RPM), and engine load, comprising manifold pressure ('MAP') and/or airflow ('MAF'). The ECM 10 is preferably operable to regularly determine an engine operating point based upon the monitored engine operation. Other sensors include those operable to monitor external conditions, and operator demand, and are typically signally attached to the system controller 10 via wiring harnesses. Operator inputs include an operator demand for power, as determined by a position of accelerator pedal 4 or throttle position sensor (not shown), as well as operator input to a brake pedal (demand for vehicle deceleration or braking) and operator input to a cruise-control device (demand for consistent vehicle speed).

Control algorithms in each of the control processors are typically executed during preset loop cycles such that each control algorithm is executed at least once each loop cycle. Algorithms stored in the non-volatile memory devices are executed by the respective central processing unit and are operable to monitor inputs from the sensing devices and execute control and diagnostic routines to control operation of the respective device, using preset calibrations. Loop cycles are typically executed each 3.125, 6.25, 12.5, 25 and 100 milliseconds during engine and vehicle operation. Alternatively, control algorithms may be executed in response to occurrence of an event. A cyclical event, e.g. calculating engine fueling, may be executed each engine cycle. An action to start the engine 20 after it is turned off is preferably executed in response to an event, e.g. an operator demand for acceleration which is detected by monitoring operator input to accelerator pedal 4. Alternatively, the action to start the engine 20 after it is turned off may be a quasi-cyclic event, wherein the powertrain controller 10 cyclically monitors vehicle conditions such ambient air temperature, and implements an engine start event on a subsequent loop cycle in order to provide additional functionality.

The integrated vehicle control system is signally connected to the aforementioned sensors and other sensing devices, and operably connected to output devices to monitor and control engine and vehicle operation. The output devices preferably include subsystems providing for proper control and operation of the vehicle, including the engine, transmission, and brakes. The sensing devices providing signal input to the vehicle include devices operable to monitor vehicle operation, external and ambient conditions, and operator commands.

In overall operation, the ECM 10 sends control commands to the PEB 36 in the form of torque, speed, or voltage-control commands, depending on the desired hybrid function. The PEB broadcasts key control parameters such as motor speed, delivered torque, temperature, and diagnostics. The ESCM 18 monitors key inputs to support hybrid battery (i.e. HV battery 40) state optimization, in addition to supporting automatic fan and disconnect control. The ECM and the TCM interact to coordinate gear-shift and TCC operation to maximize fuel economy and optimize driveability. Each of these control actions are preferably executed while integrating operation of the BCM and the HVAC. Hybrid powertrain operations of the exemplary system preferably include engine start/stop; fuel-cut during vehicle deceleration using the electrical machine 34 to provide smoothing of driveline torque; control of battery charge/discharge; regenerative braking; electrical power assist; and, electrically motored creep.

The internal combustion engine 20 comprises any one of a number of known internal combustion engine configurations, including by way of example, a four-cylinder, four-cycle spark-ignition engine. Its operation is primarily controlled by the ECM 10.

The exemplary transmission preferably comprises a known clutch-to-clutch four-speed automatic transmission device operable to transmit torque between the engine and torque converter and the driveline. The transmission 24 has a plurality of gear ratios typically providing transmission input/output speed ratios ranging from about 3.0/1 to 0.74/1. Its operation is controlled primarily by the TCM 12.

The torque converter 22 includes known torque-converter clutch (not shown) which is lockable. The torque-converter clutch is controllable to an open position, a locked position, and a controlled-slip condition. When the torque-converter clutch is in the locked position, the input rotational speed to the transmission 24 is equal to engine rotational speed, typically measured as rotational speed of the engine crankshaft, in revolutions per minute, or 'RPM'. When the torque-converter clutch is in the controlled-slip condition, the input rotational speed to the transmission 24 is within a specific rotational speed of the engine rotational speed, typically a difference of around twenty RPM. When the torque-converter clutch is in the open position, there is no fixed relationship between the input rotational speed to the transmission 24 and the engine rotational speed. The torque-converter clutch is typically controlled by a solenoid-type actuator that is controlled by the TCM 12.

The TCM 12 preferably includes control algorithms and predetermined calibrations useable to control ongoing operation of the transmission 24 and torque-converter clutch 22, preferably in coordination with other control processors. The transmission calibration preferably includes a predetermined gear shifting pattern which controls gear shifting within the transmission based upon operator torque requests comprising inputs to the accelerator pedal, engine operating speed, and vehicle speed. In a system equipped with electronic throttle control, wherein there is the accelerator pedal 4 which sends an electrical signal to operate a throttle motor, the accelerator pedal position (APS) is effectively decoupled from position of the throttle (TPS). For example, there can be a low value for APS, and a large value for TPS, and engine load (MAP) depending on the vehicle speed and operator transient actions to the APS. Also, during an accelerator tip-in event there can be a small value for APS and a large value for TPS and MAP, whereas under quasi-static operation there can be a low value for APS as the operator slowly tips out of the throttle (but not to APS=0) coupled with a low value for MAP.

Figure 3:
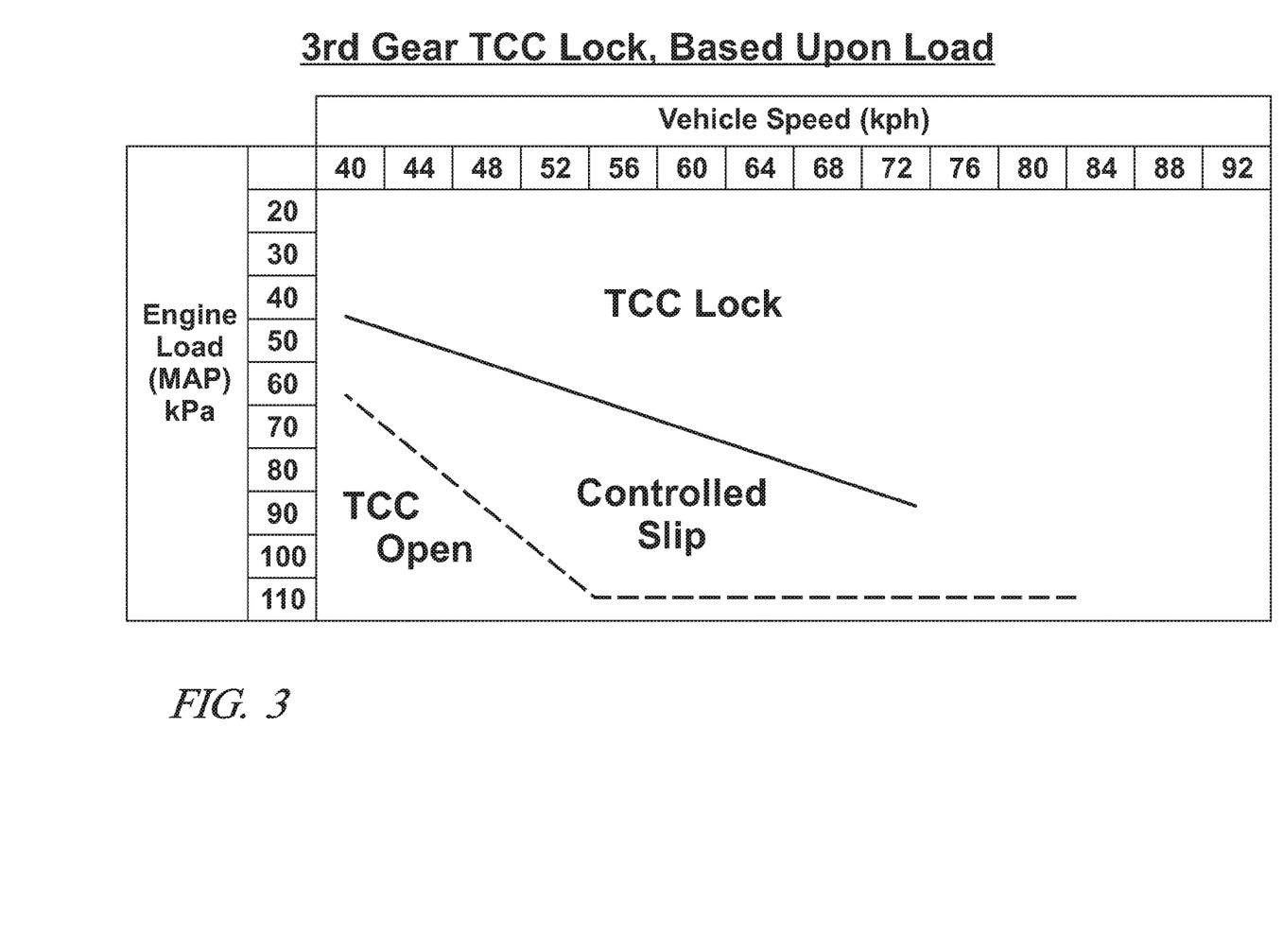
Figure 4:
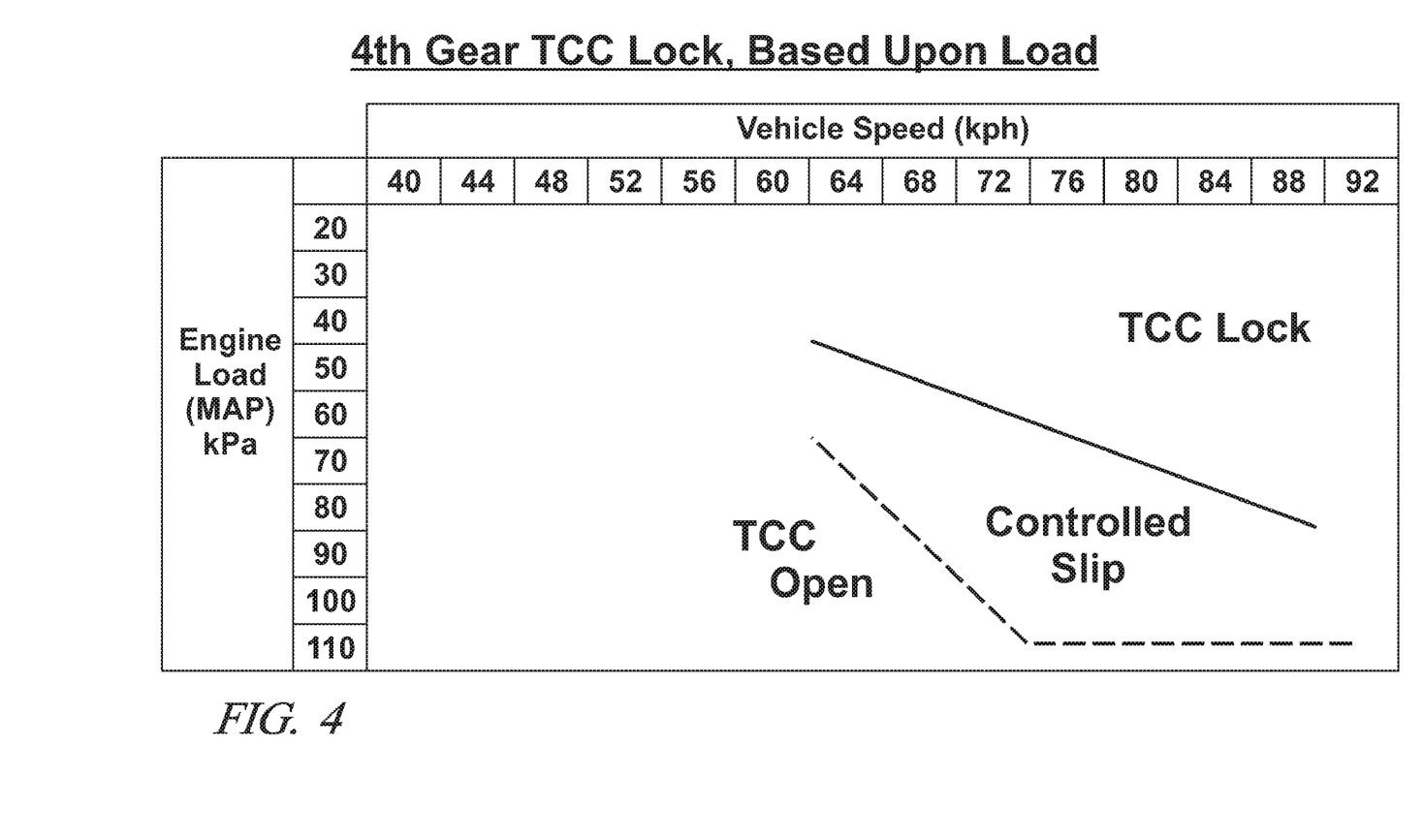

Referring again to FIG. 1, and referring also to FIGS. 2-4, an embodiment of the invention is now detailed, wherein the previously described vehicle propulsion system operates as detailed herein. The distributed vehicle control system includes a computer program encoded therein for effecting a method to regenerate the electrical energy storage device using kinetic energy of the vehicle. As described herein, regenerating the electrical energy storage device using kinetic energy of the vehicle is distinguishable from charging the electrical energy storage device in that the energy for regenerating is derived from vehicle kinetic energy, whereas energy for charging the electrical energy storage device is derived from power generated by operation of the internal combustion engine. The computer program comprises monitoring an operator demand for power, preferably using input to the accelerator pedal 4, and, vehicle speed. Furthermore, engine load is determined, preferably by monitoring engine manifold absolute pressure (in kPa), using the MAP sensor previously referenced. The torque-converter clutch or TCC is actuated based upon the operator demand for power, the vehicle operating speed, and, the engine load. Actuating TCC comprises actuating the locking clutch for the torque converter when the engine load is less than a first calibrated engine load, which is determinable based upon the operator demand for power and the vehicle operating speed. The TCC actuation is shown with reference now to FIGS. 2 and 3, which comprise representative data graphs having exemplary calibrations for actuating the torque-converter clutch in third gear of the exemplary vehicle system described above. FIG. 2 demonstrates a calibration for the actuating the TCC when the operator demand for power or torque, APS, is less than a predetermined level for a specific vehicle speed. Line C demonstrates the calibration values for operator demand for power, and vehicle speed. A final decision by the vehicle control system to actuate the TCC is further based upon engine load, as shown in FIG. 3, which demonstrates TCC lock (i.e. actuated), a controlled slip, and TCC open (i.e. deactivated) for third gear operation over a range of vehicle speeds. The actuated TCC is subsequently deactivated at an operating point determined when the engine load is greater than a second calibrated engine load determinable, the second calibrated engine load determined based upon the operator demand for power and the vehicle operating speed. The first calibrated engine load is preferably greater than the second calibrated engine load at each monitored operator demand for power and each monitored vehicle operating speed. Although described, this actuation/deactivation hysteresis is not shown graphically. A specific feature of the control system as described is shown with reference to FIG. 2, wherein the TCC can remain actuated (Line C) at a vehicle speed less than a calibrated transmission shift vehicle speed (Line A) when the operator demand for power is below a predetermined power threshold and the engine load is below the second calibrated engine load. The operation of the system is now explained with reference to FIGS. 2 and 3, wherein operation of the exemplary system is described in further detail.

FIGS. 3 and 4 comprise representative data graphs having exemplary calibrations for controlling locking of the torque-converter clutch. FIG. 3 shows the calibration for operation of the exemplary transmission 24 in third gear. FIG. 4 shows the calibration for operation of the exemplary transmission 24 in fourth gear. The calibration controls locking of the torque-converter clutch in a locked position, a controlled-slip condition, and also controls opening of the TCC, as shown in both FIGS. 3 and 4. When the TCC is locked, operation of the torque-converter clutch is determined based upon vehicle speed (kph) and engine load (MAP). When the engine load is less than, or above, the TCC-lock calibration line, the torque-converter clutch is actuated, permitting regenerative braking. When the engine load is greater than the TCC-open calibration line, i.e., below the TCC-lock calibration line but above the TCC-open calibration line, the torque-converter clutch is actuated in a controlled slip operation, and regenerative braking may continue to occur. When the engine load is greater than the TCC-open calibration line, the TCC is open, and regenerative braking does not occur.

Referring again to FIG. 2, Line A comprises an exemplary conventional calibration line for shifting between second and third gears, based upon vehicle speed (kilometers per hour, or kph) and the operator torque request, which is the previously described APS. Line B comprises an exemplary conventional, prior art calibration line for applying the torque-converter clutch, for operation in third gear, as a function of vehicle speed (in kph) and the operator torque request, APS. Line C shows the calibration line for applying the torque-converter clutch that has been adjusted by adding the dimension of engine load, or MAP, in accordance with the invention. Torque converter clutch calibration Line C demonstrates an expanded operating range for the TCC, especially at low levels of operator torque requests. This includes an ability to have the TCC actuated or enabled across the 2-3 shift point (shown with reference to Line A) when the operator torque request is low. This expands potential operating range of the TCC, thus permitting greater opportunity for the vehicle to engage in regenerative braking.

An example operating point in accordance with the invention is shown at point E, wherein the transmission operating in third gear at a vehicle speed of about 48 kph, and a throttle position or APS of about fifteen percent. In this situation, as shown with reference to the calibration in FIG. 3, operation of the torque-converter clutch is based upon engine load (MAP). In a prior art, conventional control system, shown with reference to Line B of FIG. 2, the TCC would not be actuated. In a load-based TCC lock calibration, shown with reference to FIG. 2 and FIG. 3, The TCC may be actuated. In this situation, with reference specifically to FIG. 3, actuating the TCC would be based upon engine load. When the engine load was 50 kPa or less, the TCC would be locked. When the engine load was between 50 kPa and about 90 kPa, a controlled-slip condition would occur. Each of the aforementioned conditions would permit some level of regenerative braking. Only when the engine load was greater than about 90 kPa would the TCC be open, thus not permitting any form of regenerative braking to occur.

Thus, operator input, in the form of throttle position or accelerator pedal position, vehicle speed, and engine load are each used to determine whether to actuate the torque-converter clutch. Once activated, the torque converter clutch is deactivated when any one of the operator demand for power, the vehicle speed, or the engine load falls outside calibrated values.

In a further enhancement to the invention, hysteresis is introduced in the system, wherein the control system is calibrated so the operator input, the vehicle speed and engine load threshold levels required for initially locking the torque-converter clutch are greater than threshold levels required for unlocking the locked torque-converter clutch. This hysteresis is preferably applied to the operator input, i.e. the operator demand for power, although it can be applied to any of vehicle speed, engine load, and operator input.

Preferably, actuating the torque converter clutch includes actuating the locking clutch at a vehicle/engine operating point wherein clutch slip is substantially nil, i.e. there is no difference in rotational speed between the output of the engine crankshaft and the input to the transmission. Actuating the locking clutch for the torque converter may also include actuating the locking clutch for the torque converter such that there is a controlled clutch slip less than a predetermined amount of slip, for an amount of time, with a difference in the range of twenty revolutions per minute (20 RPM) between the engine crankshaft speed and the speed of the input shaft to the transmission.

The system further includes actuating the locking clutch for the torque converter based upon the operator demand for power, the vehicle speed, the engine load, and, barometric pressure and operation of the cruise control system. This operation preferably includes the MAP or load thresholds having applied to them a factor for barometric pressure, determinable by the ECM using the MAP sensor, and compensation for operating the cruise-control system. In an exemplary system, for throttle response at high altitudes, the MAP threshold at which the TCC is slipped or opened is preferably lowered by a predetermined value based upon barometric pressure. Similarly, the MAP threshold is preferably lowered by a predetermined value when cruise control is enabled to enhance speed controllability on a graded road surface.

Detailed aspects of the aforementioned componentry of the exemplary embodiment is known to a skilled practitioner, although it is understood that alternate embodiments using novel componentry may fall within the scope of the invention described herein. Although this is described in context of a vehicle having a BAS hybrid system, it is understood that alternate embodiments of this invention can include other vehicle systems having hybrid and non-hybrid configurations with fixed gear transmissions and locking torque converters. This includes vehicle systems operable to translate vehicle kinetic energy to electrical energy potential.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method to regenerate an electrical energy storage device using kinetic energy of a vehicle having an internal combustion engine operably coupled to an electrical machine and to a torque converter operably coupled to a transmission device wherein the vehicle kinetic energy is transmittable to the electrical machine electrically connected to the electrical energy storage device, comprising:
    monitoring an operator demand for power, an operating speed of the vehicle, and, an engine load;
    determining a first calibrated engine load based upon the operator demand for power and the vehicle operating speed;
    actuating a locking clutch for the torque converter when the monitored engine load is less than the first calibrated engine load;
    determining a second calibrated engine load based upon the operator demand for power and the vehicle operating speed;
    deactivating the actuated locking clutch for the torque converter when the monitored engine load is greater than the second calibrated engine load; and
    deactivating the actuated locking clutch for the torque converter at a vehicle speed less than a calibrated transmission shift vehicle speed when the operator demand for power is below a predetermined power threshold and the engine load is below the second calibrated engine load.

2. The method of claim 1, wherein the first calibrated engine load is greater than the second calibrated engine load at each monitored operator demand for power and each monitored vehicle operating speed.

3. The method of claim 1, wherein actuating the locking clutch for the torque converter further comprises actuating the locking clutch for the torque converter such that clutch slip is substantially nil.

4. The method of claim 1, wherein actuating the locking clutch for the torque converter further comprises actuating the locking clutch for the torque converter such that there is a controlled clutch slip less than a predetermined amount of slip.

5. The method of claim 1, further comprising actuating the locking clutch for the torque converter based upon the operator demand for power, the engine operating speed, the engine load, and, barometric pressure.

6. The method of claim 1, further comprising actuating the locking clutch for the torque converter based upon the operator demand for power, the engine operating speed, the engine load, barometric pressure, and, operation of a cruise control system.

7. Article of manufacture, comprising a storage medium having a computer program encoded therein for effecting a method to regenerate an electrical energy storage device using kinetic energy of a vehicle having an internal combustion engine operably coupled to an electrical machine and to a torque converter operably coupled to a transmission device wherein the vehicle kinetic energy is transmittable to the electrical machine electrically connected to the electrical energy storage device, the program comprising:
    code for monitoring an operator demand for power, a vehicle operating speed, and, an engine load;
    code for determining a first calibrated engine load based upon the operator demand for power and the vehicle operating speed; code for actuating a locking clutch for the torque converter when the monitored engine load is less than the first calibrated engine load; code for determining a second calibrated engine load based upon the operator demand for power and the vehicle operating speed; code for deactivating the actuated locking clutch for the torque converter when the monitored engine load is greater than the second calibrated engine load; and
    code for deactivating the actuated locking clutch for the torque converter at a vehicle speed less than a calibrated transmission shift vehicle speed when the operator demand for power is below a predetermined power threshold and the engine load is below the second calibrated engine load.

8. The article of manufacture of claim 7, wherein the first calibrated engine load is greater than the second calibrated engine load at each monitored operator demand for power and each monitored vehicle operating speed.

9. The article of manufacture of claim 7, wherein the electrical energy storage device comprises a high voltage battery system.

10. The article of manufacture of claim 7, wherein the internal combustion engine operably coupled to an electrical machine comprises the internal combustion engine having a bi-directional accessory drive device operably coupled to the electrical machine operable to generate electrical energy for storage in the electrical energy storage device.

11. The article of manufacture of claim 10, wherein the electrical machine is operable to convert electrical energy from the electrical energy storage device to torque transmissible to the internal combustion engine via the bi-directional accessory drive device.

12. Vehicle propulsion system, comprising:
    an internal combustion engine operably coupled to a torque converter operably coupled to a transmission device operably connected to a vehicle driveline;
    an electrical machine, electrically coupled to an electrical energy storage device;
    a bi-directional accessory drive device, operable to transmit torque between the electrical machine and the internal combustion engine; and,
    a control system, comprising a storage medium having a computer program encoded therein for effecting a method to regenerate an electrical energy storage device using kinetic energy of the vehicle wherein the vehicle kinetic energy is transmissible from the vehicle driveline to the electrical machine via the bi-directional accessory drive device, the engine, the transmission device, and the torque converter, the computer program comprising:
        code for monitoring an operator demand for power, a vehicle operating speed, and, an engine load;

code for actuating a locking clutch for the torque converter based upon the operator demand for power, the vehicle operating speed, and, the engine load including code for actuating the locking clutch for the torque converter when the engine load is less than a first calibrated engine load, wherein the first calibrated engine load is determined based upon the operator demand for power and the vehicle operating speed;

code for deactivating the actuated locking clutch for the torque converter when the engine load is greater than a second calibrated engine load, the second calibrated engine load determined based upon the operator demand for power and the vehicle operating speed, wherein the first calibrated engine load is greater than the second calibrated engine load at each monitored operator demand for power and each monitored vehicle operating speed; and code for deactivating the actuated locking clutch for the torque converter at a vehicle speed less than a calibrated transmission shift vehicle speed when the operator demand for power is below a predetermined power threshold and the engine load is below the second calibrated engine load.

13. Method to regenerate an electrical energy storage device using kinetic energy of a vehicle having an internal combustion engine operably coupled to an electrical machine and to a torque converter operably coupled to a transmission device wherein the vehicle kinetic energy is transmittable to the electrical machine electrically connected to the electrical energy storage device, comprising:

monitoring an operator demand for power, a vehicle operating speed, and, an engine load;

determining a first calibrated engine load based upon the operator demand for power and the vehicle operating speed;

actuating a locking clutch for the torque converter when the monitored engine load is less than the first calibrated engine load; determining a second calibrated engine load based upon the operator demand for power and the vehicle operating speed;

deactivating the actuated locking clutch for the torque converter when the monitored engine load is greater than the second calibrated engine load; and deactivating the actuated locking clutch for the torque converter at a vehicle speed less than a calibrated transmission shift vehicle speed when the operator demand for power is below a predetermined power threshold and the engine load is below the second calibrated engine load.

14. The method of claim 13, wherein the first calibrated engine load is greater than the second calibrated engine load at each monitored operator demand for power and each monitored vehicle operating speed.

15. The method of claim 13, wherein the electrical energy storage device comprises a high voltage battery system.

16. The method of claim 13, wherein the internal combustion engine operably coupled to an electrical machine comprises the internal combustion engine having a bi-directional accessory drive device operably coupled to the electrical machine operable to generate electrical energy for storage in the electrical energy storage device.

17. The method of claim 16, wherein the electrical machine is operable to convert electrical energy from the electrical energy storage device to torque transmissible to the internal combustion engine via the bi-directional accessory drive device.

\* \* \* \* \*